United States Patent [19]

Kammiller

[11] Patent Number: 4,468,722

[45] Date of Patent: Aug. 28, 1984

[54] POWER SUPPLY HAVING SLOPE CONTROLLED OUTPUT VOLT-AMPERE CHARACTERISTIC

[75] Inventor: Neil A. Kammiller, Lakewood, Ohio

[73] Assignee: Reliance Electric Company, Cleveland, Ohio

[21] Appl. No.: 402,633

[22] Filed: Jul. 28, 1982

[51] Int. Cl.³ .............................................. H02P 13/22
[52] U.S. Cl. ........................................ 363/71; 307/44; 363/21
[58] Field of Search ....................... 363/21, 69, 70, 71, 363/80; 307/44–46; 323/234

[56] References Cited

U.S. PATENT DOCUMENTS

| | | | |
|---|---|---|---|
| 4,276,590 | 6/1981 | Hansel et al. | 363/71 |
| 4,371,919 | 2/1983 | Andrews et al. | 363/80 |
| 4,425,613 | 1/1984 | Shelly | 363/71 |

FOREIGN PATENT DOCUMENTS 2056199  3/1981  United Kingdom ................ 323/234

OTHER PUBLICATIONS

Azzis et al., "Parallel Identical Direct-Mode DC-DC Converters" IBM Technical Discl. Bulletin, vol. 25, No. 2, p. 6245, Jul. 1982.

*Primary Examiner*—William H. Beha, Jr.
*Attorney, Agent, or Firm*—Michael M. Rickin

[57] ABSTRACT

A circuit for use in the voltage control loop of a power supply of the type which regulates its output voltage to a predetermined amplitude to allow at least two of the supplies to be connected by an associated series diode to the same external load so as to share that load on a substantially equal basis and avoid false indications of supply malfunction that may result from that connection at no load. In a first embodiment, the circuit controls the slope of the volt-ampere characteristic by linearly changing at the input to the voltage regulating means the signal representative of output voltage as a function of supply output current. In a second embodiment, the circuit controls the shape of the volt-ampere characteristic at no load by changing the predetermined amplitude to which the output voltage is regulated. The supply also includes a preload which is inserted in parallel with the external load.

8 Claims, 8 Drawing Figures

POWER SUPPLY HAVING SLOPE CONTROLLED OUTPUT VOLT-AMPERE CHARACTERISTIC

BACKGROUND OF THE INVENTION

1. Field of the Invention

This invention relates to power supplies and more particularly to means included therein which allow two such supplies to be connected to an external load so as to share that load on a substantially equal basis and so as to avoid false indications of supply malfunction arising from that connection at no load.

2. Description of the Prior Art

In many applications, the specifications require that there be redundant power supplies for each load. Quite typically in such applications one of the redundant supplies (hereinafter called the "primary") provides almost the total power requirements of the load and the other of the redundant supplies (hereinafter called the "secondary") serves as a back-up which also provides a small amount of power to the load. Upon the failure of the primary supply, the secondary supply provides the total power requirements of the load. Therefore, arrangements of primary and secondary supplies of the type described above function quite well in many applications by providing the desired redundancy. These arrangements do, however, have some deficiencies.

Upon switching from the primary to the secondary supply, a transient disturbance may be introduced into the load. The arrangements described above tend to maximize that transient and, therefore, its effect on the load as the secondary supply must go from essentially no load to full load when the switching occurs. In addition, while the primary and secondary supplies are identical circuits, the components therein do not age on a substantially equal basis. In general, the components of the primary supply are ordinarily subjected to load operating conditions whereas the components of the secondary supply are ordinarily subjected to only minimal load operating conditions. It has been found that, where the primary and secondary supplies are designed so as to share the load on a substantially equal basis, the transients described above are minimized and the components of each supply tend to age in a substantially equal manner. Therefore, it is desirable that circuitry be included in each supply which allows for the supplies to be connected across the load in parallel in a manner so that there be an almost substantially equal sharing of load between the primary and secondary supplies.

Each supply includes a diode in series with its output. The supplies are each connected to the load through their associated series diodes. The diode functions to disconnect the supply from the load should the supply be turned off as the result of a fault condition occurring therein or for some other reason. Each of the supplies also include leads which are used to sense the output voltage of the supply. The sensed voltage is used by each supply in order to regulate its output voltage. The sense leads are usually connected to sense the supply output voltage at a point prior to the series diode. While this connection allows each supply to regulate its output voltage, it does not take into account the voltage drop across the diode when it conducts or the variation of diode characteristics with temperature. It is also desirable, therefore, that the output voltage of each supply when connected so as to share the load be more closely regulated than is possible when the sensing leads are connected as described above.

In addition, when supplies are connected across the load in parallel so as to share that load on a substantially equal basis it has been found that any difference in their volt-ampere characteristics will give rise to an alarm condition when there is no external load. This is not a true alarm but a false alarm which arises from the sharing of the load by the supplies and the sensing for purposes of voltage regulation that each supply does at the load. Therefore, it is desirable that this false alarm be inhibited at no external load in a manner such that true alarms are not so inhibited.

SUMMARY OF THE INVENTION

According to the present invention, there is disclosed a circuit for use in the voltage control loop of a power supply to thereby control the volt-ampere characteristic of the supply in a manner such that at least two of the supplies may be connected to share an external load without ambiguity and avoid false indications of supply malfunction even in the region where the load falls between some relatively small amount and no load. The supply includes circuitry which is responsive to the output voltage of the supply as sensed at the load to generate a signal which is representative thereof. The supply also includes voltage regulation circuitry which is responsive to the output voltage representative signal and a signal having a predetermined amplitude to thereby regulate the output voltage of the supply.

In a first embodiment, the circuit includes means which respond to the output current of the supply to derive a d-c signal representative thereof. A modifying means responds to the current representative signal to generate at the junction at which the output voltage representative signal is connected to the voltage regulation circuitry a signal which changes linearly with changes in output current. As the sum of the signals at the junction is kept constant, the voltage representative signal changes in a linear manner opposite to the change in the modifying means signal. In this manner, the slope of the volt-ampere characteristic is controlled.

In a second embodiment, the invention controls the volt-ampere characteristic of the supply in the region between no load and some relatively small load to thereby allow at least two of said supplies to be connected across the external load without the occurrence of false indications of supply malfunction arising from the connection. In this embodiment, the invention includes means for inserting across the external load a preload. Also included are means which respond to the output current of the supply to derive a signal representative thereof and a reference signal having an amplitude representative of the relatively small external load to change the signal having the predetermined amplitude. When the external load is greater than the relatively small load, the signal of predetermined amplitude represents a first amplitude of supply output voltage at the load and when the external load falls within the region the signal is changed to represent a second amplitude of supply output voltage of the load. In this manner, the volt-ampere characteristic is controlled in the region so that no false indications of supply malfunction arise from the connection of the supplies to the load.

DESCRIPTION OF THE PREFERRED EMBODIMENT

Figure 1:
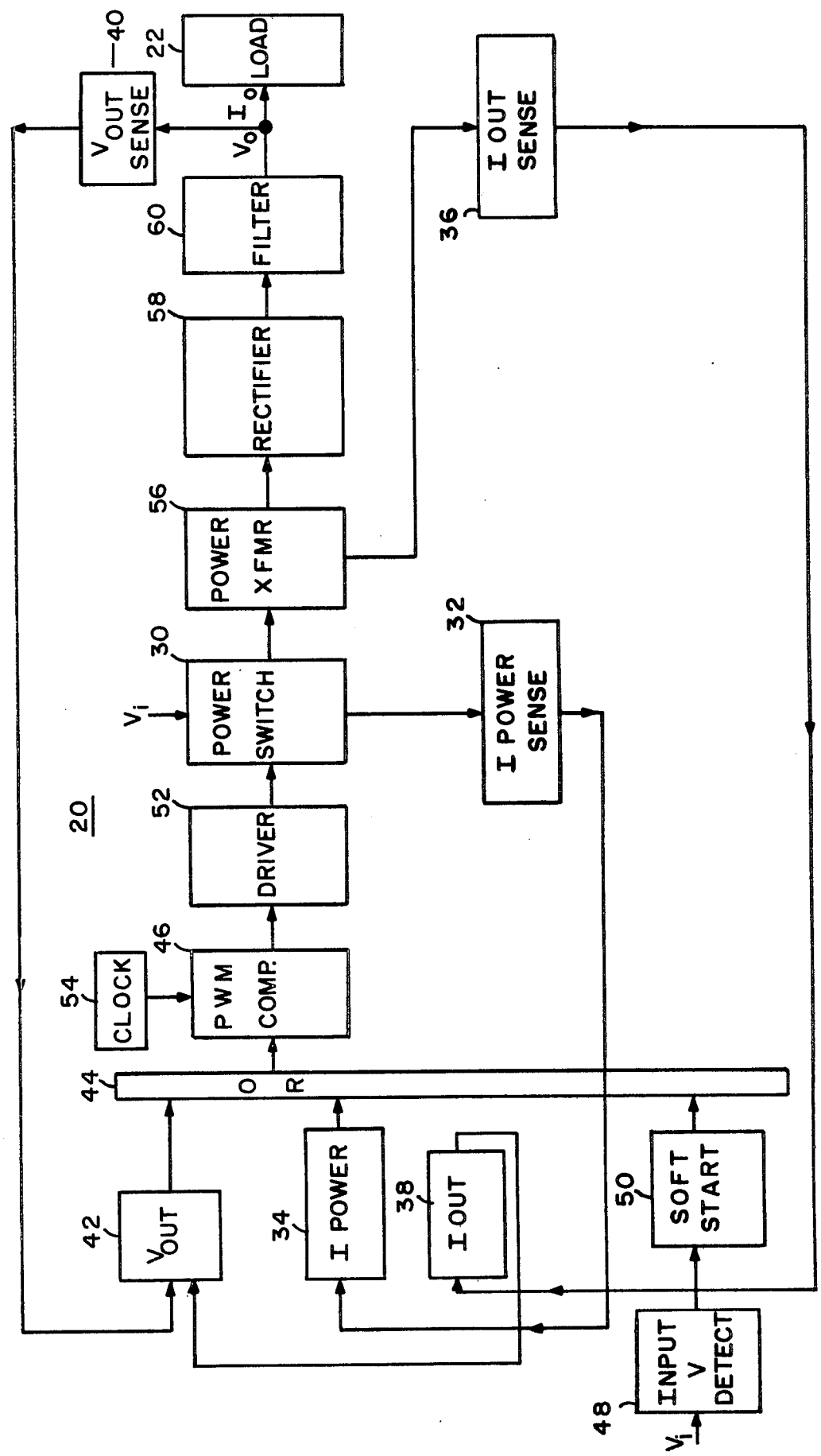
FIG. 1 is a block diagram of a typical switched mode type power supply in which the present invention may be used.

Referring to FIG. 1 there is shown a block diagram of a power supply 20 to generate from a d-c input voltage designated as Vi a d-c output voltage designated as Vo to thereby supply power to load 22. While supply 20 is shown as a d-c to d-c converter, it should be appreciated that the input voltage Vi may be an unregulated d-c voltage which is obtained from an a-c voltage by the combination of a rectifier and capacitor bank (not shown). Supply 20 is of the type wherein a power switch 30 is turned on and off by the use of the well-known pulse width modulation (p.w.m.) technique. The operation of supply 20 is controlled as a function of either its output voltage or current in the power switch 30. Supply 20 includes a circuit 32 which is used to monitor the current in the power switch 30. As is well known in the art, it is desirable to monitor the current in the power switch so as to be able to control the switching of switch 30 in the event that excessive current should flow therein.

The current in switch 30 may be monitored by a transformer. The sensing transformer is connected to a circuit 34 which first generates a d-c signal which is representative of the current being monitored. Circuit 34 then compares that d-c signal to a predetermined reference signal. Circuit 34 may be embodied by the combination of a first diode having its anode connected to one end of the secondary winding of the monitoring transformer and its cathode connected to the parallel combination of a resistor and a capacitor which provides a load for the monitoring transformer. The first diode disconnects the load when the power switch is off to thereby allow the monitoring transformer to be reset. In this manner, energy which is stored in the transformer core during the time the transformer is set is not dissipated across the transformer load. A peak charging circuit, including a diode, a capacitor and a resistor, may then be connected across the load to generate a d-c voltage representative of the current being monitored.

The d-c signal representative of the current is stored in the capacitor of the peak charging circuit and is one input to an operational amplifier functioning as an analog comparator. The other input to the comparator is a d-c signal which corresponds to a predetermined current. When the current being monitored reaches or exceeds the predetermined amplitude, the switching of the power switch is then controlled by circuit 34 to thereby regulate the current to the predetermined amplitude.

Supply 20 must also monitor its output voltage, Vo, to maintain regulation thereof. A sensing circuit 40 is used to provide a sample of Vo to circuit 42 which compares two voltages. One of the voltages compared by circuit 42 is simply a voltage proportional to Vo and may be obtained by use of a resistive voltage dividing network having Vo as its input voltage. The other voltage compared by circuit 42 is a reference voltage which may be provided by the combination of a zener diode and a resistive network including an adjustable resistor.

Each of the outputs of circuits 34 and 42 are provided as inputs through OR circuit 44 to p.w.m. comparator circuit 46. The output of supply 20 is then controlled by circuit 46 as a function of either the output voltage or the current in power switch 30. A clock circuit 54 provides the sawtooth waveform which circuit 46 uses in its comparison. While circuits 34, 42, 44, 46 and 54 have been shown as separate, they may be embodied by an integrated circuit chip such as type 494 which is available from manufacturers such as Texas Instruments or Motorola.

Sometimes it is desirable to provide circuitry which ensures that the p.w.m. circuitry of the supply does not provide a usable output to switch 30 until such time as the input voltage to the supply reaches a predetermined amplitude. This circuitry is provided in the form of input voltage detector 48 and soft start circuit 50, the output of which is connected as another input to OR circuit 44. The input voltage to supply 20 may, for example, be provided from a d-c source such as the bank of batteries located at a typical telephone operating company central office.

Detector circuit 48 may, for example, be embodied by an operational amplifier, one input of which receives a predetermined reference voltage generated from a stable source such as a zener diode in combination with a resistive voltage dividing network. The other input to the operational amplifier may be connected by a voltage dividing network to receive a voltage representative of the input voltage to supply 20. When the input voltage exceeds the reference voltage, the operational amplifier changes its state to provide a signal to soft start circuit 50.

Soft start circuit 50 may be embodied, for example, by a capacitor which prior to the change in state of the operational amplifier in circuit 48 has been held discharged by a transistor. One end of the capacitor may be connected to a predetermined voltage. The other end of the capacitor is connected to the appropriate one of the inputs of the 494 chip when the p.w.m. circuitry is so embodied. When the operational amplifier changes states, the transistor then allows the capacitor to charge down to common (OV). In response thereto the chip is activated to thereby provide a usable output to switch 30 and associated driver circuit 52.

Supply 20 also includes a power transformer 56 whose primary winding is connected in series combination with switch 30. Connected to the secondary winding of the transformer is the combination of rectifier 58 and filter 60. The circuitry which may be used to embody switch 30, transformer 56, rectifier 58 and filter 60 depends on the type of switched mode power architecture that is used for supply 20. For example, if supply 20 uses the well-known feed forward, or as it sometimes may be called forward converter, architecture, then energy is transferred to the load when power switch 30 is conducting. When the switch is turned off, part of the energy which is stored in filter 60 is transferred to the load through a commutating or free-wheeling diode (not shown) which is connected in shunt between rectifier 58 and filter 60. Rectifier 58 may be embodied in its simplest form by a diode connected in series with the secondary winding of transformer 56. Filter 60 may be embodied in its simplest form by an L-C network in which the inductor is in series with the rectifier diode. It is the energy stored in the inductor which is transferred to the load during the off time of switch 30.

Finally, supply 20 includes a circuit 36 to sense the current which flows through the secondary winding of power transformer 56 of the supply. This is an alternating current which, after being rectified by circuit 58 and filtered by circuit 60, appears at the output of the supply as a d-c current designated in FIG. 1 as Io. Sensing circuit 36 is connected to a circuit 38 which utilizes the sensed current, as will be described hereinafter, to modify the volt-ampere characteristic of supply 20 in various ways to allow the supply to be connected in parallel to share the load on a substantially equal basis and also avoid the false alarm problems normally associated with paralleled supplies at no load. For ease of illustration, circuits 36 and 38 carry the designation I OUT SENSE and I OUT, respectively, in FIG. 1 even though it should be appreciated that what is being sensed by circuit 36 is not the d-c output current Io of supply 20 but rather the a-c current in the secondary winding of the power transformer.

Figure 2:
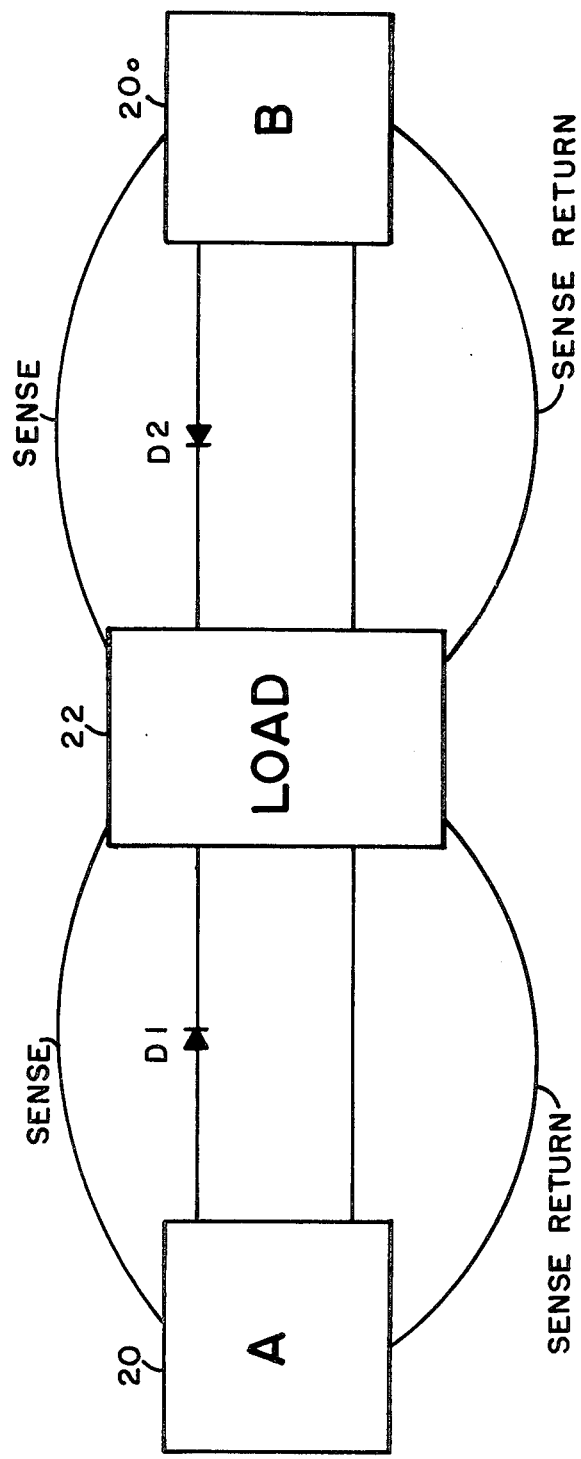
FIG. 2 is a block diagram illustrating the paralleling of two identical supplies of the type shown in FIG. 1 to share a load.

Referring to FIG. 2 there is shown a block diagram which illustrates the paralleling of two identical supplies 20 to thereby share in a substantially equal manner load 22. Each of the supplies is connected to the load by a series diode, poled as shown in FIG. 2. The diode connecting the left-hand supply to the load is designated as D1 whereas the diode connecting the right-hand supply to the load is designated as D2. The diodes D1 and D2 function to disconnect the load from the associated supply upon the occurrence of a fault condition in that supply or if the supply should be turned off for reasons other than the occurrence of a fault condition. A pair of leads designated as SENSE and SENSE RETURN extend from each supply to the load side of its associated diode to thereby provide a signal representative of the output voltage of the supply. This signal is used by each supply to regulate its output voltage.

As will be described hereinafter in connection with the circuit shown in FIG. 3, there is included in each of the paralleled supplies a circuit 70 which allows load sharing to take place on a substantially equal basis. The circuit 70 is a part of the circuit 38. When two supplies are to be connected in parallel, it is necessary that the volt-ampere characteristics of each supply allow for substantially equal sharing to take place without introducing any ambiguity. Where two supplies each having equal and flat volt-ampere characteristics are connected in parallel, an ambiguity arises as to the amount of current that flows into the load from each supply. For sharing to take place, even if unequally, the only requirement is that at the desired voltage the sum of the currents provided by the two supplies be equal to the load current. As the volt-ampere characteristics of the two paralleled supplies are equal and flat, the current provided by each supply need not be equal to each other in order to meet the above requirement. Any combination of current will satisfy the requirement and, therefore, it is highly likely that the two supplies will share the load unequally. In addition, each time two such supplies are placed in parallel, the percentage of load sharing of each supply will not necessarily be the same. Thus, where two paralleled supplies each have flat and equally adjusted volt-ampere characteristics, the percentage of the load current that will be provided by each supply is ambiguous.

Figure 4:
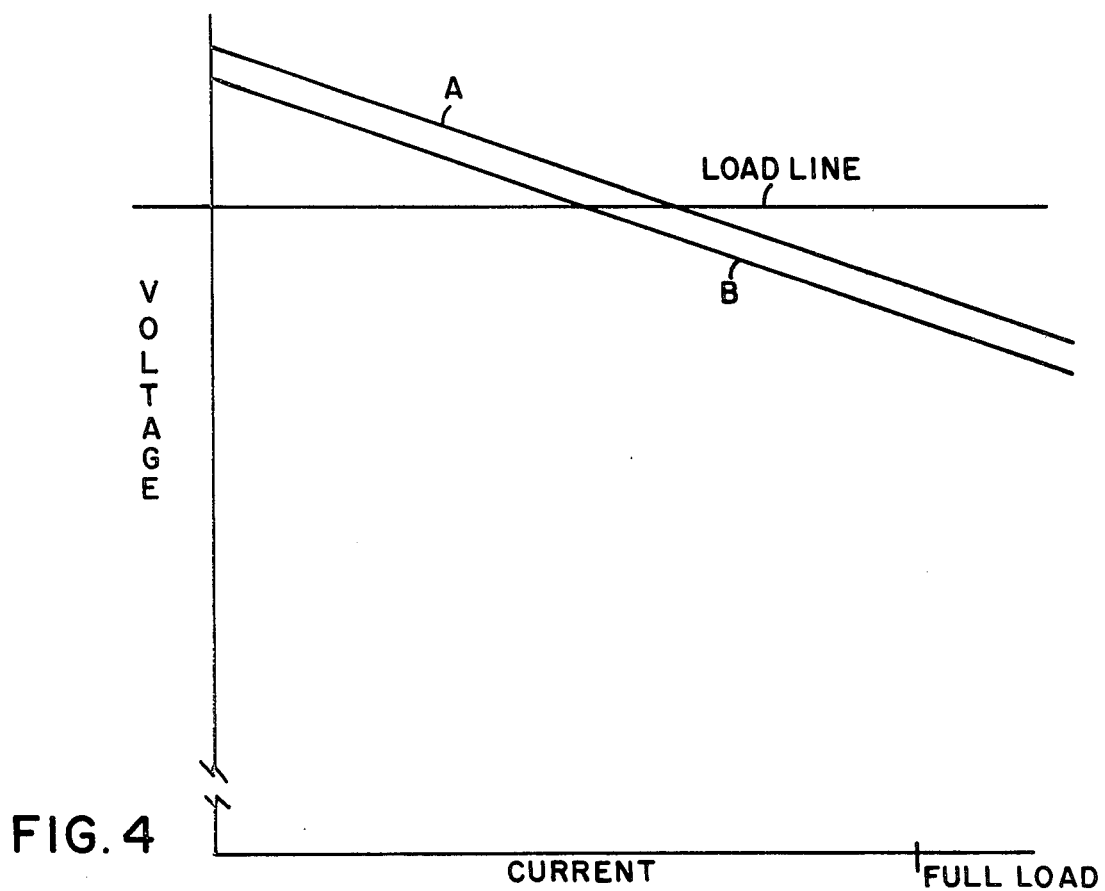
FIG. 4 shows the volt-ampere characteristics of the paralleled supplies of FIG. 2 with the effect thereon of the embodiment of FIG. 3.

In order that two paralleled supplies share the load on a substantially equal basis, it has been found that it is necessary to cause the volt-ampere characteristic of each supply to have a slight but controlled downslope, as shown in FIG. 4. As will be described hereinafter, it is this controlled downslope in the characteristic which allows the paralleled supplies to load share on an essentially equal basis.

Figure 3:
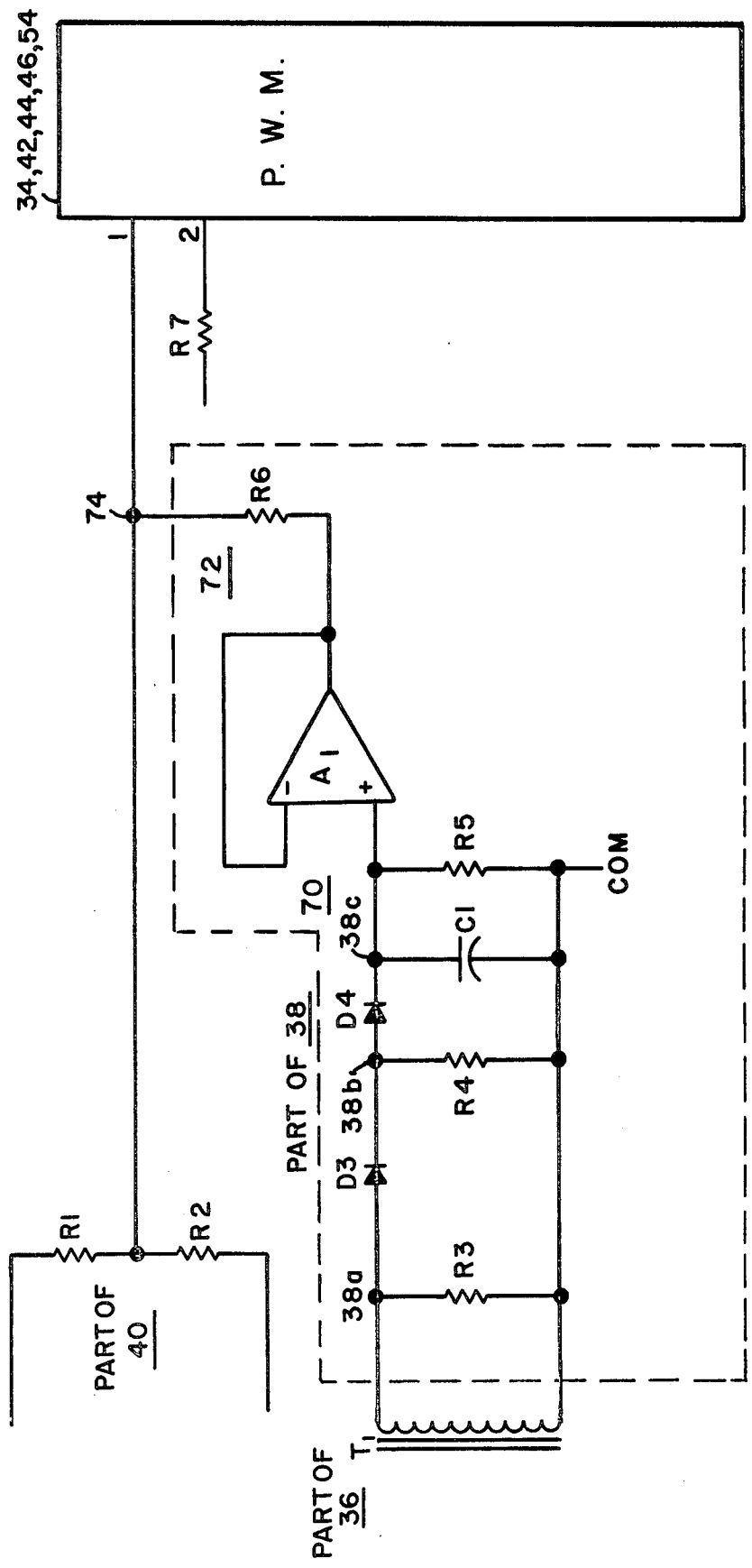
FIG. 3 is a schematic diagram of the embodiment of the present invention which allows the load sharing to take place on a substantially equal basis.

Referring to FIG. 3 there is shown a circuit 70 included in or added to supply 20 which is used to control the slope of the volt-ampere characteristic of the supply in a manner that allows two such paralleled supplies to share the load 22 on a substantially equal basis. Circuit 70 senses by a transformer T1 which is part of circuit 36 the alternating current flowing in the secondary winding of the power transformer 56. The secondary winding of T1 is shown in FIG. 3 and is connected at one end to the input terminal designated as 38a and at its other end to circuit common designated as COM. A resistor R3 is connected in parallel across the secondary winding which changes the pulsating current which appears on the winding to a voltage.

A diode D3, poled as shown, is connected in series between input terminal 38 and the junction designated as 38b. A resistor R4 is connected at one end to the cathode of diode D3 at junction 38b and its other end to COM. A diode D4 has its anode connected to the cathode of diode D3 at junction 38b and its cathode connected at the junction designated as 38c to one end of the parallel combination of a capacitor C1 and a resistor R5. The other end of the parallel combination is connected to COM. The diode D3 functions to disconnect the transformer in circuit 36 for negative polarities from circuit 38 to thereby remove the load therefrom so that the transformer can reset. In this manner, the energy stored in the core of transformer T1 when it is set is not dissipated across the transformer load. Resistor R4 acts as a load on the transformer. Diode D4 is used to peak charge capacitor C1 during the positive-going polarity of the pulsed output current of the supply. The resistor R5 has a relatively large resistance and, therefore, provides in combination with capacitor C1 a large time constant to thereby prevent C1 from discharging by other than a minimal amount during the off time of the output current pulses. Therefore, the voltage which is representative of the current flowing in the secondary of the power transformer remains substantially constant for a given level of output current.

The junction of the cathode of diode D4 and the combination of capacitor C1 and resistor R5 is connected to the noninverting input of an amplifier A1 whose inverting input is connected directly to its output. The amplifier A1 functions as a voltage follower to thereby provide at its output the d-c voltage on capacitor C1 which is representative of the current flowing in the output circuits of supply 20.

In the embodiment for circuit 70 shown in FIG. 3, it has been assumed that power switch 30 of the supply includes only a single power device. Therefore, switch 30 conducts only in one direction and the core of transformer T1 cannot be automatically reset as would occur when switch 30 included an even number of power devices which conducted alternately. If the power switch were so embodied, then diode D3 could be removed from circuit 70. Of course, in that case diode D4 would be replaced by an appropriate arrangement of more than one diode, such as a bridge, to fullwave rectify the alternating signal to thereby peak charge C1.

The output of the amplifier is connected by a circuit 72 which is also part of circuit 38 to the p.w.m. circuitry of supply 20. The p.w.m. circuitry of the supply will be assumed to be embodied by the 494 chip. Therefore, circuit 72 connects the amplifier output to pin 1 thereof. Circuit 72 is embodied by the resistor R6 connected in series between the output of the amplifier and pin 1. Also connected to pin 1 of the chip is a voltage representative of the output voltage, Vo, of supply 20. This representative voltage is generated by the series combination of resistors R1 and R2 (part of circuit 40 of FIG. 1) connected across the SENSE and SENSE RETURN leads. The center point between the resistors is connected directly to pin 1 of the chip. A resistor R7 is used to connect a reference voltage to pin 2 of the chip.

The junction at which circuit 72 and the center point of the resistors R1 and R2 meet is designated in FIG. 3 as 74. The 494 chip functions as a voltage detector and the current flowing into pin 1 is in the order of several nano-amperes. Therefore, the current flowing into pin 1 of the chip will remain essentially zero. The total current flowing into junction 74 is the sum of two components. One of the components is a current, Iv, representative of the supply output voltage which flows into junction 74 from the center point of R1 and R2. The other component is a current, Ii, representative of the output current of the supply which flows into junction 74 through circuit 72. The currents Iv and Ii are of more substantial amplitude than the several nano-amperes drawn by pin 1 of the chip.

The resistances of resistors R1, R2 and the impedance of circuit 72 are related in a manner such that the current Ii is small as compared to the current Iv. As the current Ii increases, the current Iv must decrease in order that the total current into junction 74 remain constant. The only manner in which the current Iv can decrease when the current Ii increases is for the output voltage control loop of supply 20 to cause the output voltage of the supply to decrease. As circuit 72 has been embodied by a linear element, resistor R6, then, as the output current of the supply increases, the voltage at the output of the supply decreases. In this manner the volt-ampere characteristic of supply 20 exhibits a linear downslope. When two of supply 20 are connected in parallel across load 22 and each supply is adjusted to have a substantially identical downslope in its volt-ampere characteristic, then the supplies will share the load on a substantially equal basis.

In a circuit constructed in accordance with the present invention, the following component values were used:

R1 = 5.14 × 10³ ohms
R2 = 3.92 × 10³ ohms
R3 = 1.0 × 10³ ohms
R4 = 44.6 ohms
R5 = 1.0 × 10⁶ ohms
R6 = 274 × 10³ ohms
R7 = 4.75 × 10³ ohms
C1 = 0.1 microfarads In such a supply the volt-ampere characteristic has a slope such that the output voltage of supply 20 decreased 0.016 percent for each one ampere increase in the supply output current.

Referring to FIG. 4 there is shown the volt-ampere characteristics for each of two paralleled supplies. The upper characteristic designated by the letter A is associated with the left-hand supply shown in FIG. 2 and the lower characteristic designated by the letter B is associated with the right-hand supply shown in that figure. As described above, in order that the supplies share the load on a substantially equal basis, each of the characteristics have a slight and identical downslope. For each of illustration, the downslope of each characteristic has been exaggerated in FIG. 4 and the voltage scale has been greatly expanded. For a circuit 72 constructed in accordance with the component values described above, the output voltage of the supply may vary from no load to full load approximately plus and minus one percent (±1%) about its nominal value. Similarly, the nominal voltage for each of the two supplies is usually adjustable within one-one hundredth of a percent (0.01%) of each other.

In FIG. 4 there has been drawn a load line which shows the value of current provided by each supply for a given output voltage and load condition. As can be seen, the two supplies provide substantially equal amounts of current to thereby share the load on a substantially equal basis. As the load is decreased the current provided by each supply decreases. At no load, where neither supply provides a current, the output voltage of the "B" supply would be lower than the output of the "A" supply. As both supplies sense their output voltage on the load side of the diodes D1 and D2, the p.w.m. circuitry of each supply is controlling the time of conduction of the associated power switch to thereby, in effect, regulate or control the voltage of the supply at the load. Therefore, the term "output voltage of the supply" or "output of the supply" will be taken to refer hereinafter to the load side of the associated series diode D1 or D2. As the two supplies are in parallel with respect to the load, the sensing circuit of the "B" supply, therefore, sees a voltage which is above what it should be according to the volt-ampere characterisitc.

The p.w.m., circuitry of the "B" supply will, in response to the sensed voltage, attempt to lower the supply's output voltage by reducing the time of conduction of its power switch. Eventually the "B" supply lowers the time of conduction of its power switch to the point where the "B" supply output voltage falls below some predetermined lower limit. When this condition occurs, alarm circuitry included in the supply which, in effect, compares the actual output voltage of the supply to a reference representing a predetermined lower voltage limit gives rise to an alarm condition. This is not a true alarm, but a false alarm which occurs because of the combination of the condition that the supplies share substantially equally for all loads and the previously described sensing by each supply at the load. It is desirable, therefore, that this false alarm condition be overcome at no load.

One technique which may be used for overcoming the false alarm is simply by inhibiting the low voltage alarm circuitry in each supply at no load. While this technique may appear attractive and be easy to implement, it leaves the converter without circuitry for indicating a true low voltage alarm condition at no load. An alternative technique for dealing with no load false low voltage alarms in a manner such that those alarms are inhibited and true alarms are allowed is described in more detail below.

Figure 6:
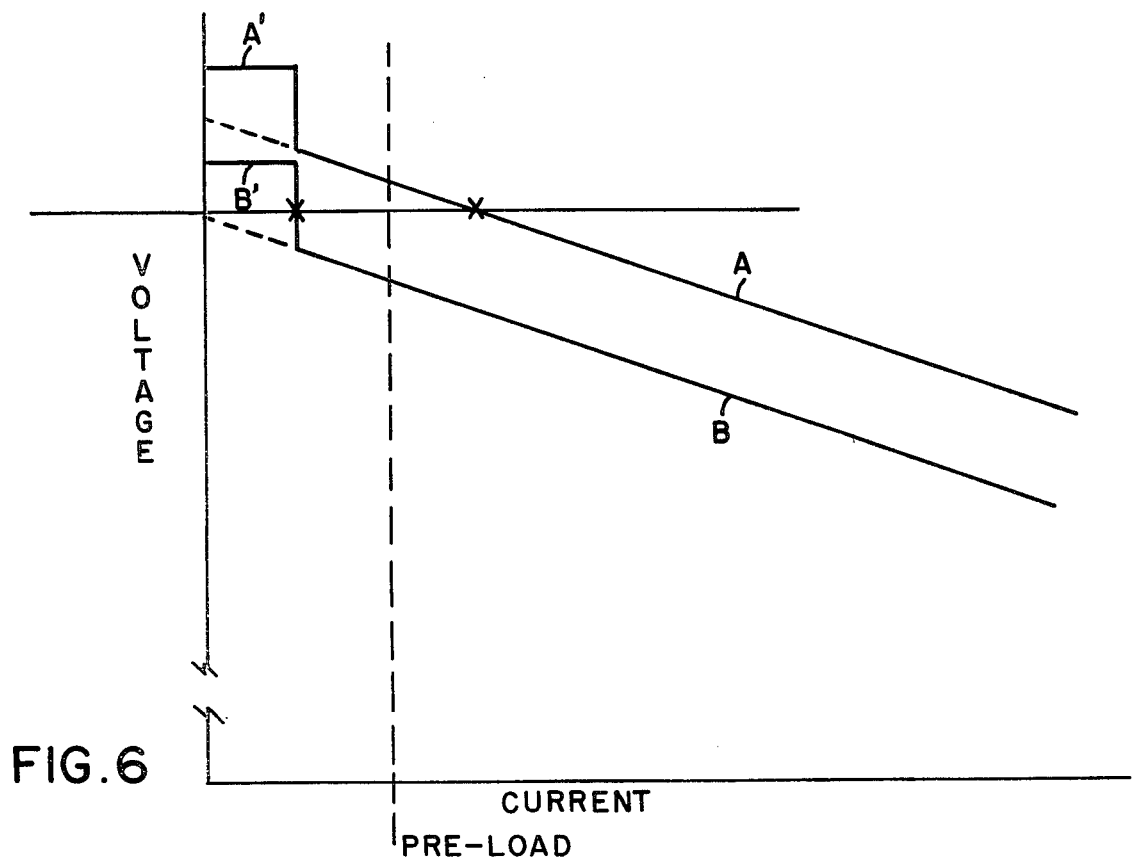
FIG. 6 shows the volt-ampere characteristics of the paralleled supplies of FIG. 2 with the effect thereon of the embodiment of FIG. 5.
Figure 5:
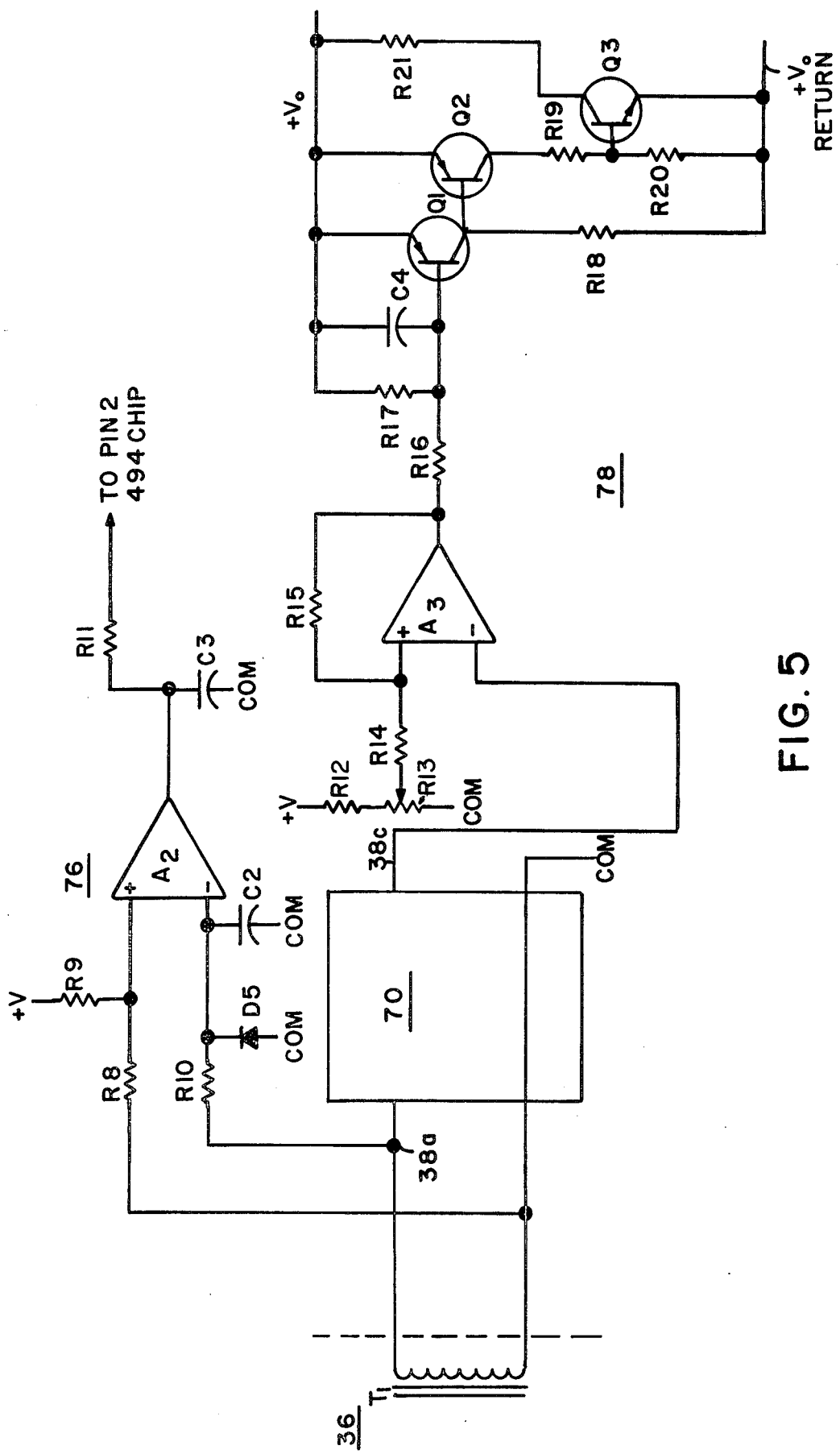
FIG. 5 is a schematic block diagram of the embodiment of the present invention which allows the paralleled supplies of FIG. 2 to be so connected at extremely small or no loads without any false indications arising therefrom.

Referring to FIG. 5 there are shown circuits 76 and 78, each of which are also part of circuit 38, which in combination function to provide in supply 20 a manner of operation at no load which inhibits false low voltage alarms yet allows true alarms to occur. Also shown is that part of circuit 38 designated as 70 in FIG. 3. As circuit 70 has been described in detail previously, it is shown here in block form with the understanding that it is identical to and functions in exactly the same manner as circuit 70 of FIG. 3. Therefore, circuit 70 provides between junction 38c and COM a d-c voltage representative of the current flowing in the output circuits of supply 20. While the operation of circuits 76 and 78 will be described in connection with supply 20, it should be appreciated that these circuits may be used in any other type of supply which must load share in parallel and sense voltage at the load in the manner shown in FIG. 2. The operation of circuits 76 and 78 will be described in connection with the volt-ampere characteristics of FIG. 6. As these circuits are concerned with supply operation with no external load, the volt-ampere characteristics shown in FIG. 6 are identical to the characteristics shown in FIG. 4 with the exception that the portion of the characteristic in FIG. 4 adjacent to no external load has been greatly enlarged. The differences in the shape of the characteristics of FIG. 6 from those shown in FIG. 4 will be described in more detail hereinafter.

Circuit 76, as will be described hereinafter, introduces into the volt-ampere characteristic of each supply a generally rectangular shaped region where the output voltage of the supply is slightly higher than it ordinarily would be as determined from the sloped volt-ampere characteristic. In this region which covers the range from no load to some predetermined load current, the output voltage of the supply is substantially constant. As this generally rectangular shaped region represents an increased or boosted voltage from no load to the predetermined load current, it will be referred to hereinafter as the "boost-up" portion of the characteristic, and circuit 76 will be referred to hereinafter as the "boost-up" circuit. The boost-up portions of characteristics A and B are designated as A' and B', respectively, in FIG. 6.

Circuit 78, as will be described hereinafter, introduces across the output of supply 20 a low resistance at no external load operating conditions. This resistance which is, in effect, an internal load on the supply is connected in parallel with the load on the cathode side of the diodes D1 and D2. In the embodiment for circuit 78 being described herein, this load remains connected until the load current reaches a predetermined amount which is indicative of a certain actual external load being connected to the supply. When that amount of load current is reached, circuit 78 removes the low resistance. Circuit 78, therefore, functions to connect or switch a resistor to be either in parallel or not in parallel with the load as a function of predetermined levels of load current. As this resistance is connected at no external load and is, therefore, connected before or prior to the connection of an external load and as this resistor is disconnected at some predetermined load current, it will be referred to as the "switched preload" and circuit 78 in the embodiment shown in FIG. 5 will be referred to as the "switched preload" circuit. It should be appreciated that the switched preload is not a true external load on the supply in the sense that load 22 (FIG. 1) is such an external load. Rather, the switched preload is an internal load which is applied to the supply when there is no external load connected thereto.

As will be described in more detail hereinafter, circuits 76 and 78 function in combination at no load such that for the given output voltage one supply operates on the boost-up portion of its characteristic and the other supply operates on the sloped portion of its characteristic. Both supplies have their preloads connected and, therefore, both supplies must supply a total current equal to the supply output voltage divided by the resistance represented by the parallel combination of the two preloads. The one of the two supplies operating on the sloped portion of its characteristic will supply the majority of that current, whereas the other one of the supplies operating on the boost-up portion of its characteristic will supply the minority of that current. Also, as the actual load increases above a certain minimal value, the two supplies will resume substantially equal load sharing.

The operation of the boost-up circuit 76 will now be described in detail. Circuit 76 receives a signal from the secondary winding of the transformer included in output current sensing circuit 36 (FIG. 1). The signal on the winding is a pulsating current representative of the output current of supply 20. This current is changed into a voltage by resistor R3 (see FIG. 3) which is included in circuit 70 and is connected in parallel across the winding. Thus, there appears across terminals 38a and COM a voltage which is representative of the output current of the supply.

Terminal 38a is connected by a resistor R10 to the inverting input of an amplifier designated as A2 which functions as an analog comparator. A diode D5, poled as shown, and a capacitor C2 are connected in parallel between the inverting input of A2 and COM. The other end of the secondary winding is connected by a resistor R8 to the noninverting input of the comparator. A resistor R9 connects the noninverting input to a source of positive voltage, +V. The resistors R8 and R9 in combination with the voltage +V establish a relatively low reference or threshold voltage for the operation of the comparator. Resistor R10 and capacitor C2 function as a filter to smooth the voltage appearing across terminal 38a and COM such that any spikes appearing therein do not appear at the inverting terminal of the comparator. Diode functions as a clamp to produce the d.c. level or C2 representative of current.

A capacitor C3 is connected between the output of the comparator and COM. A resistor R11 connects the output of the comparator to pin 2 of the 494 chip. This connection is made at the right-hand end of the resistor R7 (see FIG. 3) which is also connected to pin 2. In the normal, nonboost-up mode of operation the comparator is on and capacitor C3 is discharged. Resistors R7 and R11 then form a voltage divider which causes the voltage at pin 2 of the 494 chip to be lower by some predetermined percentage from what it is when the comparator is off. The voltage on pin 2 of the chip is used to provide a reference voltage for the output voltage control circuit of the supply.

When the supply output current falls below the predetermined threshold, the comparator goes off and the capacitor C3 charges. The resistors R7 and R11 no longer form a voltage divider and the voltage at pin 2 of the 494 chip rises by the predetermined percentage. This rise in voltage has the effect of causing the output voltage of the supply to increase or be boosted-up by the predetermined percentage. The capacitor C3 is quite large and, therefore, charges quite slowly as compared to the period of the supply output current. Therefore, the boost-up portion appears in the supply's volt-ampere characteristic.

The operation of switched preload circuit 78 will now be described in detail. Circuit 70 provides between junction 38c and COM a d-c voltage representative of the current flowing in the output circuits of supply 20. Junction 38c is connected to the inverting input of an amplifier designated as A3 which functions as an analog comparator. The noninverting input of the amplifier is connected by a resistor R14 to the sliding contact of an adjustable resistor R13 which is connected in series with resistor R12 between circuit common and a d-c voltage, +V. This connection provides a reference voltage at the noninverting input. The noninverting input to the comparator is connected by a resistor R15 to the comparator's output. This resistor provides hysteresis to the comparator to thereby introduce stability to the switched preload circuit.

The output of the comparator is connected by a resistor R16 to a portion of circuit 78 which includes PNP transistors Q1 and Q2 and NPN transistor Q3. The preload resistor R21 is connected between the Vo output of the supply and the collector of transistor Q3. Resistor R21 is connected in parallel with the external load and is on the load side of the diodes D1 or D2 (see FIG. 2). For ease of illustration, the associated series diode has been omitted from FIG. 5. Ordinarily, transistor Q1 is on and transistors Q2 and Q3 are off and the preload resistor is not connected in parallel with the load terminals of the supply. When the voltage at the inverting input of the comparator falls below the reference voltage at the comparator's noninverting input, the comparator output changes state. This change in state turns Q1 off and turns both Q2 and Q3 on to thereby connect the preload resistor R21 in parallel with the load. As the voltage at the comparator's inverting input is representative of the output current of the supply, the preload resistor is inserted when that current falls below a first predetermined amplitude.

As mentioned above, resistor R15 provides a hysteresis effect in the comparator to thereby introduce stability in that circuit. The effect of resistor R15 is to require that the voltage at the comparator's inverting input reach a second predetermined level which is higher than the first predetermined level before the comparator changes state to disconnect the preload resistor R21 from the supply output. The hysteresis introduced by R15 ensures that the comparator is a precise switch with definite voltages at which the preload resistor will be connected or disconnected.

At no load the operation of the paralleled supplies may be summarized as follows: each supply has caused its preload resistor to be inserted in parallel with the load on the load side of the associated series diode D1 or D2. As the supplies are identical, the preload resistors are also identical and the total current into the preload should be twice the current each supply would provide its preload resistor if the supplies were not connected in parallel. This current is identified in the volt-ampere characteristics of FIG. 6 as the "preload" current. The boost-up circuit of each supply is also activated. The twice preload current is not provided equally by the two supplies. As shown in FIG. 6 for the output voltage, the supply having the upper characteristic operates on the sloped portion thereof while the supply having the lower characteristic operates on the boost-up portion thereof. For ease of explanation, the characteristics of FIG. 6 have been drawn in a manner such that the "A" supply provides a current which is one and one-half times the preload current (1.5 preload I) whereas the "B" supply provides a current which is one-half of the preload current (0.5 preload I) such that the total current provided is the desired two times the preload current (2.0 preload I). In equation form, this may be expressed as:

$$I_{TOTAL} = I_A + I_B$$
$$= 1.5 \text{ PRELOAD } I + 0.5 \text{ PRELOAD } I$$
$$= 2.0 \text{ PRELOAD } I$$

It should be appreciated that the volt-ampere characteristics shown in FIG. 6 may be obtained for each supply operating individually or when supplies are operated in parallel. In either case, the boost-up portion of the characteristic will not be seen as it will be masked by the switched preload resistor. The only way in which the boost-up portion of the characteristic may be seen is by removing the switched preload.

In a circuit constructed in accordance with the present invention, the following component values were used:

R8 = 33.2 ohms
R9 = $2.21 \times 10^3$ ohms
R10 = $3.92 \times 10^3$ ohms
R11 = $182 \times 10^3$ ohms
R12 = $15 \times 10^3$ ohms
R13 = $5 \times 10^3$ ohms nominal (adjustable)
R14 = $47.5 \times 10^3$ ohms
R15 = $182 \times 10^3$ ohms
R16 = $1.0 \times 10^3$ ohms
R17 = $4.75 \times 10^3$ ohms
R18 = 475 ohms
R19 = 36.0 ohms
R20 = 221.0 ohms
R21 = 2.0 ohms
C2 = 0.0047 microfarads
C3 = 0.1 microfarads
C4 = 10.0 microfarads While the operation of the supply at no load has been described in connection with a switched preload, it should be appreciated that a desirable result may also be obtained by having a preload which remains constant throughout the entire range of external load. Such a constant preload may, for example, be simply supplied by a resistor R21 which remains connected in parallel with the external load on the load side of the associated series diode D1 or D2 for all conditions of external load. For such a constant preload, the circuitry described above for switching the preload in and out is, therefore, not necessary.

The boost-up circuit 76 of FIG. 5 has been described in connection with a power supply 20 that includes a power transformer 56. In that supply the sensed current is an alternating waveform and is sensed by the use of a transformer. There are, however, power supplies which do not use a power transformer. Such supplies usually take the form of series d-c regulators which are used to derive a regulated d-c output voltage from an unregulated d-c input voltage.

Typically, the unregulated d-c input voltage is an auxiliary output of a main power supply to which the regulator is connected. For example, supply 20 may provide an auxiliary unregulated d-c voltage which is the input voltage to the regulator connected in series therewith. Supply 20 is able to provide this additional but unregulated d-c output voltage by, for example, including in power transformer 56 an additional secondary winding across which the unregulated voltage appears. Quite often it is desirable that two of these series regulators also be connected to a load in a manner so as to effect a form of load sharing therebetween.

In such regulators the current flowing therein is not sensed by a transformer but rather by a resistor connected in the supply as described hereinafter. Such regulators are typically used in low power applications and, therefore, the voltage developed across the resistor is usually only in the order of several hundred millivolts at full load. It is also desirable that the volt-ampere characteristic of each of the paralleled series regulating supplies exhibit at low load the boosted-up portion described above. Each of the series regulators, therefore, contain a boost-up circuit, the operation of which is described in more detail hereinafter, which functions at low load to provide the desirable boost-up portion to the supply's volt-ampere characteristic. The boost-up circuit becomes active only at low load. Therefore, the current flowing through the sensing resistor is of an amplitude to develop a voltage which is typically in the order of several millivolts. The boost-up circuit includes an operational amplifier functioning as an analog comparator. Such devices typically have a natural offset voltage which inhibits device responsiveness at such low voltage amplitudes. It is, therefore, desirable to include in the boost-up circuit of a series regulator means which will compensate for the offset and therefore improve comparator responsiveness at such low voltage amplitudes.

Figure 7:
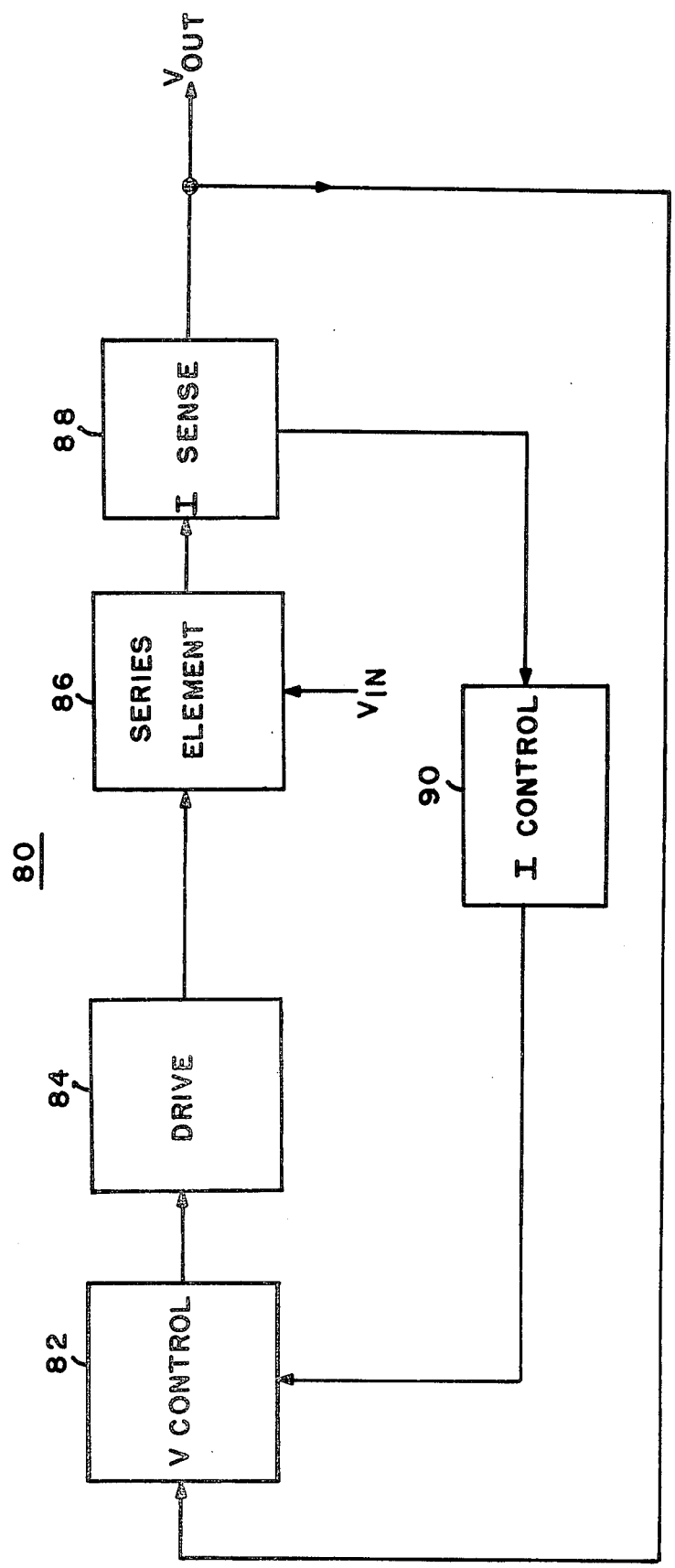
FIG. 7 is a block diagram of a typical series pass regulator in which the present invention may be used.

Referring to FIG. 7 there is shown a typical embodiment for a dissipation type regulator 80 connected to an auxiliary output of the main power supply to thereby provide at its output a regulated d-c voltage, designated as V OUT, from the unregulated d-c voltage designated as V IN present at its input. The input voltage to the regulator comes from the power transformer 56 of supply 20. The regulated d-c voltage developed by regulator 80 is used to provide power to a load (not shown) which may be the same as or included as a part of load 22 or may be different therefrom.

Regulator 80 includes voltage control circuit 82 which compares a voltage representative of the regulator output voltage V OUT to a predetermined reference voltage to thereby maintain regulation of V OUT at some predetermined amplitude. Circuit 82 is connected to drive circuit 84 which develops the driving current for series element 86. The series element is typically embodied by a transistor with the input voltage being applied to the emitter thereof and the driving current being applied to the base thereof. The output voltage appears between the collector of the transistor and circuit common. By controlling the conduction of the transistor as a function of the signal developed by voltage control circuit 82, a regulated voltage may be obtained at the output of regulator 80.

It is also desirable to control the conduction of the series element in accordance with the current flowing in the regulator to thereby have the regulator switch to a current regulated mode of operation when the current exceeds a predetermined reference amplitude. This current control is provided by the combination of a current sensing circuit 88 which is typically embodied by a resistor having a very low resistance and a current control circuit 90 to compare the sample of regulator current which is in the form of a voltage to a predetermined reference. Current control circuit 90 is connected to voltage control circuit 82 which is connected to the input of drive circuit 84. The d-c voltage present at the output of series element 86 is supplied to the load when regulator 80 operates in its voltage controlled mode.

Figure 8:
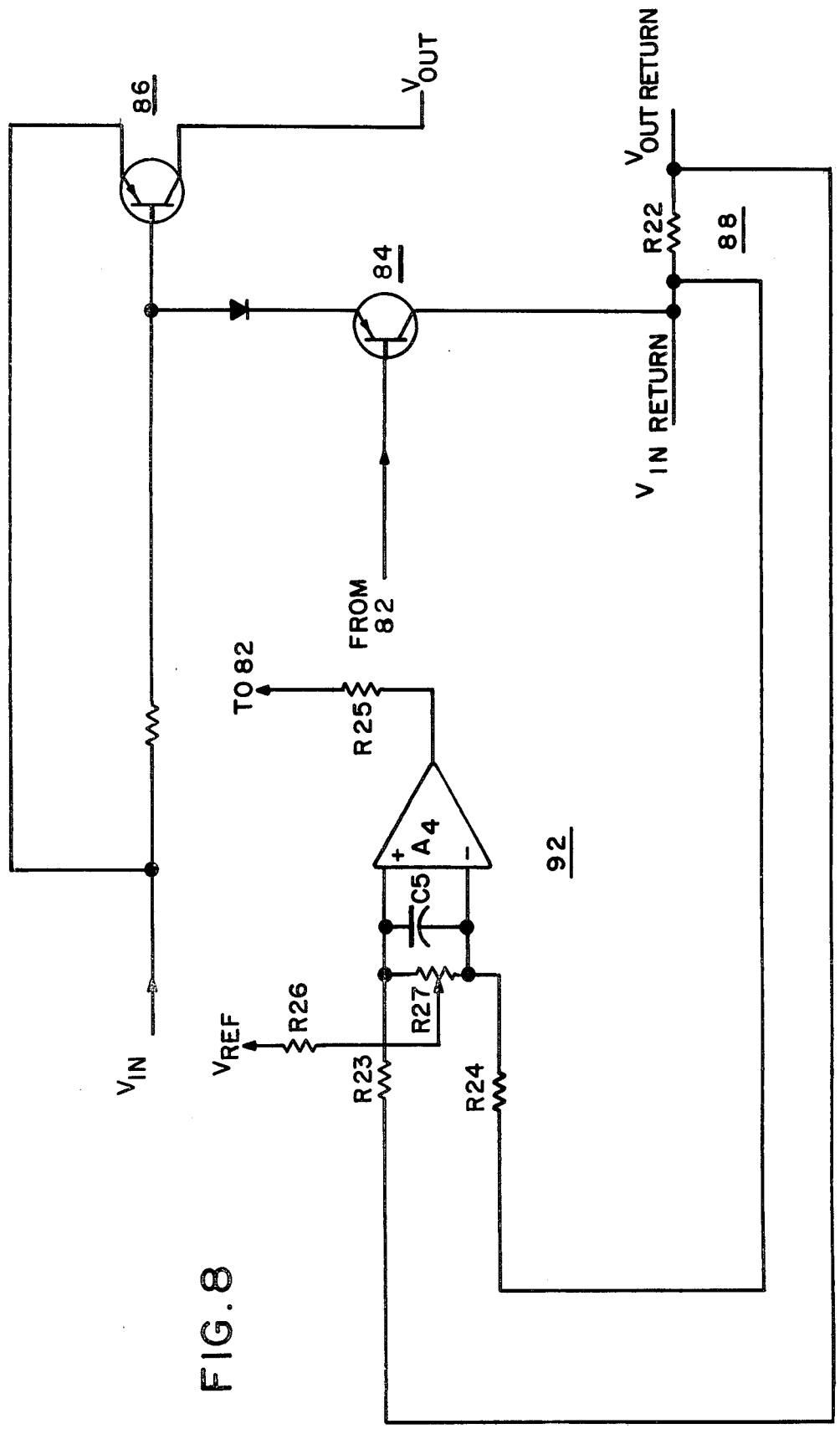
FIG. 8 is a circuit diagram of the embodiment of the present invention which allows paralleled supplies of the type shown in FIG. 7 to be interconnected at extremely small or no loads without any false indications arising therefrom.

Referring to FIG. 8 there is shown a circuit 92 which is adapted for inclusion in regulator 80 when it is desired to provide therein a volt-ampere characteristic having the boost-up portion shown in FIG. 6. Also shown in FIG. 8 are circuits 84, 86 and 88.

As described above, regulator 80 includes a series sensing circuit 88 in the form of a resistor R22 which is connected in combination with the V IN RETURN and V OUT RETURN leads to provide a voltage representative of the load current flowing in regulator 80. That voltage is applied by the resistors R23 and R24 to the noninverting and inverting inputs of an operational amplifier A4 which functions as an analog comparator. The output of A4 is connected by a resistor R25 to voltage control circuit 82. This connection is at a point which is just before one of the inputs to the comparator included in that circuit. In the nonboost-up mode of operation, the comparator is on and the voltage at the input to the comparator to which circuit 92 is connected is the reference voltage developed in voltage control circuit 82. This voltage is lower than it would be if comparator A4 were to change its state when the current in regulator 80 fell below some predetermined reference level.

Ordinarily, the reference level at which the comparator changes its state would be developed as a voltage by a suitably arranged circuit consisting of a source of d-c voltage and one or more resistors. This reference voltage would be connected only to one of the inputs of A4. It is desired, however, that A4 change its state so as to effect boost-up when the load current in regulator 80 reaches some relatively low amplitude. As the sensing resistor R22 is of relatively low resistance, the voltage developed thereacross by this current is only in the order of one millivolt. Comparator A4 has a natural offset voltage which is also in the order of a few millivolts and, therefore, the comparator will ordinarily not change its state until that offset has been overcome. Thus, the conventional and ordinary connection of a reference voltage to A4 is not sufficient to overcome this offset.

Boost-up circuit 92 therefore includes a source of reference voltage which is not connected to A4 in the ordinary and conventional manner but is connected in the manner described hereinafter to not only compensate for the offset voltage of A4 but also provide the desired reference voltage. This reference source is provided by a fixed voltage, designated as V REF, which is connected by a fixed resistor R26 to the adjustable part of resistor R27. The adjustable resistor R27 is connected in parallel with a capacitor C5 across the input terminals of A4. It is the inclusion of this adjustable resistor R27 and its connection across the inputs of A4 which provide compensation for the offset voltage of A4. Resistor R27 is adjusted so that at quiescent operation for regulator 80 it provides sufficient current from V REF so as to match the offset voltage of A4. Resistor R27 is also adjusted to provide that additional amount of current which will allow A4 to change its state when the desired voltage appears across sensing resistor R22.

In a circuit constructed in accordance with the present invention, the following component values were used:

R22=0.0675 ohms
R23=R24=100 ohms
R25=150×$10^3$ ohms
R26=47.5×$10^3$ ohms
R27=20×$10^3$ ohms (nominal-is adjustable)
C5=10 microfarads.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A circuit for use in a power supply to control the slope of its output volt-ampere characteristic so as to allow at least two of said supplies to share a load on a substantially equal basis said supply deriving a signal representative of its output voltage and having a regulation means responsive to said output representative signal to thereby regulate said output voltage to a predetermined amplitude said voltage representative signal being connected to said regulation means at a predetermined junction, said circuit comprising:
   (a) means responsive to the output current of said supply to derive a d-c signal representative thereof; and
   (b) modifying means connected to said predetermined junction and responsive to said current representative signal for generating at said junction a signal which changes linearly with changes in said output current, said voltage representative signal changing in a linear manner opposite to the change in said modifying means signal to thereby keep the sum of said signals at said junction constant whereby said slope is controlled.

2. The circuit of claim 1 wherein said output current responsive means includes transformer means connected to said supply in a manner so as to derive an a-c signal representative of said output current and peak charging means responsive to said a-c signal for generating said d-c signal.

3. The circuit of claim 1 or 2 wherein said modifying means includes a discrete resistor having a predetermined resistance and having one end connected to said predetermined junction.

4. The circuit of claim 3 wherein said modifying means further includes voltage following means for connecting the other end of said resistor to said output current responsive means.

5. A power supply which controls the slope of its output volt-ampere characteristic in a manner so as to allow at least two of said supplies to share a load on a substantially equal basis comprising:
   (a) means responsive to the output voltage of said supply for deriving a signal representative thereof;
   (b) means responsive to said voltage representative signal and a signal representing a predetermined amplitude of said output voltage to thereby regulate said output voltage to have said predetermined amplitude said voltage representative signal being connected to said regulation means at a predetermined junction;
   (c) means responsive to the output current of said supply to derive an a-c signal representative thereof; and
   (d) modifying means connected to said predetermined junction and responsive to said current representative signal for generating at said junction a signal which changes linearly with changes in said output current, said voltage representative signal changing in a linear manner opposite to the change in said modifying means signal to thereby keep the sum of said signals at said junction constant whereby said slope is controlled.

6. The circuit of claim 5 wherein said output current responsive means includes transformer means connected to said supply in a manner so as to derive an a-c signal representative of said output current and peak charging means responsive to said a-c signal for generating said d-c signal.

7. The circuit of claim 5 or 6 wherein said modifying means includes a discrete resistor having a predetermined resistance and having one end connected to said predetermined junction.

8. The circuit of claim 7 wherein said modifying means further includes voltage following means for connecting the other end of said resistor to said output current responsive means.

* * * * *